W. S. SMITH.
AUTOMATIC SCALE.
APPLICATION FILED JAN. 25, 1912.
1,241,672.
Patented Oct. 2, 1917.
2 SHEETS—SHEET 2.
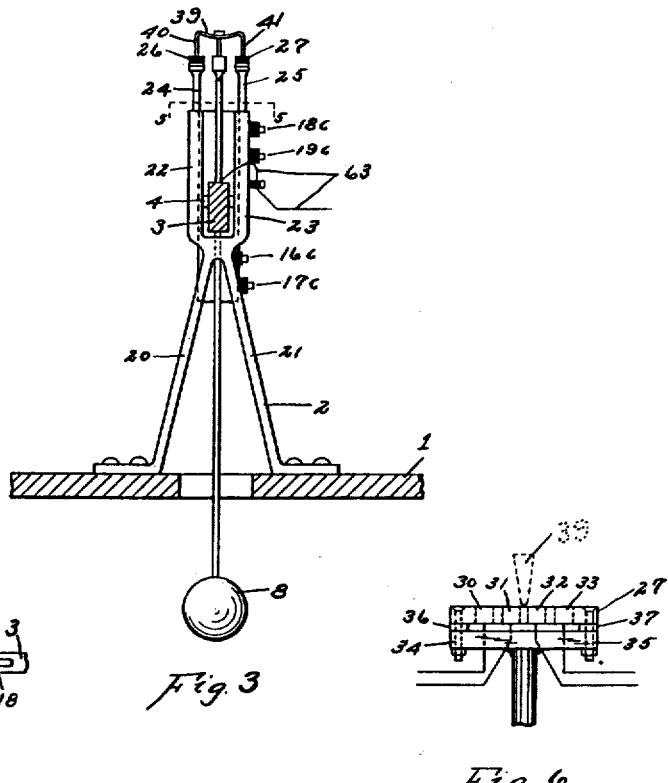
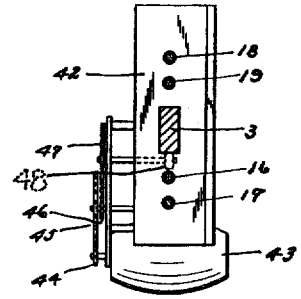
Inventor
Walter S. Smith
Witnesses
By
C. C. Shepherd
Attorney

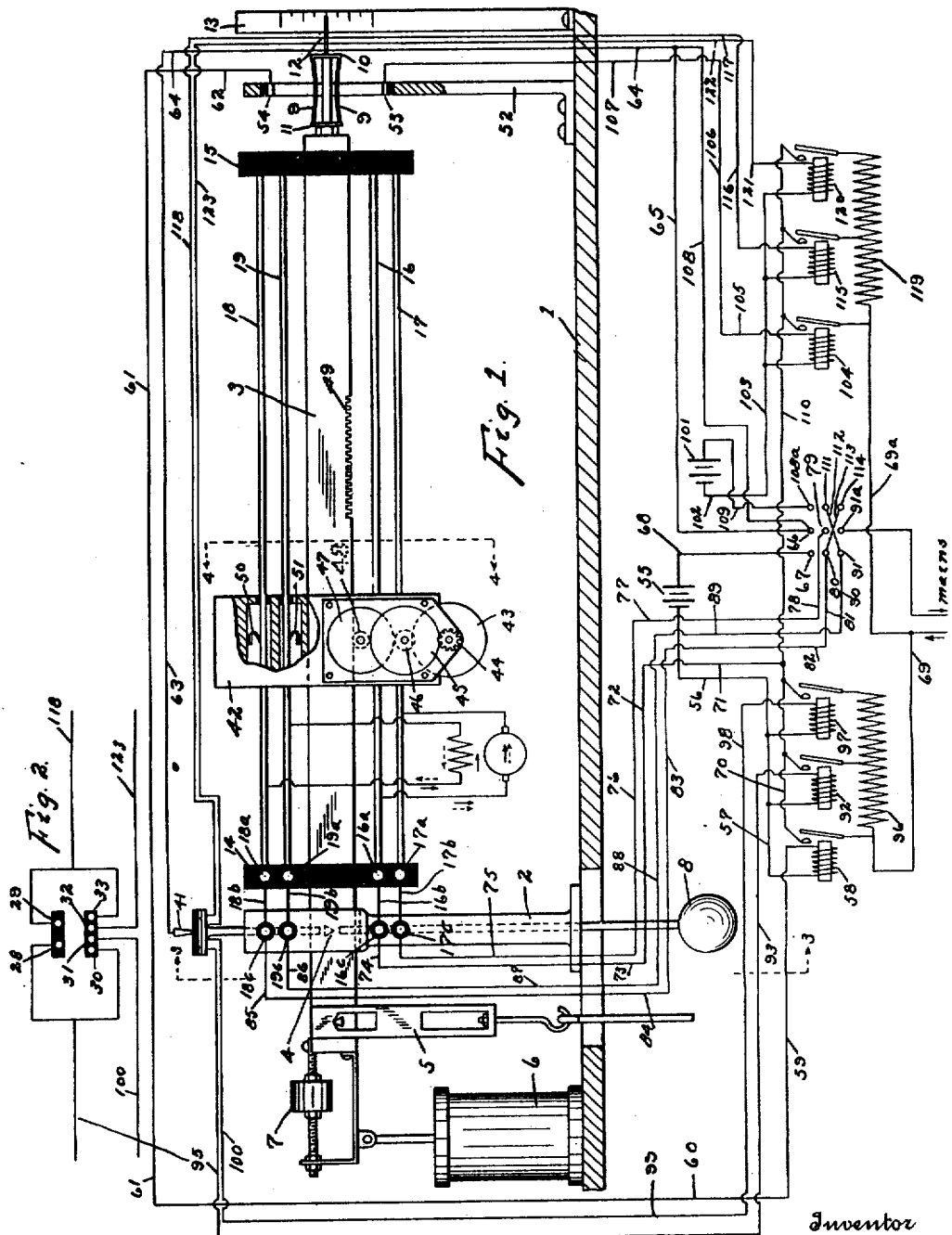

UNITED STATES PATENT OFFICE.

WALTER STANDISH SMITH, OF COLUMBUS, OHIO, ASSIGNOR TO LEWIS R. DRAKE, OF COLUMBUS, OHIO.

AUTOMATIC SCALE.

1,241,672.   Specification of Letters Patent.   Patented Oct. 2, 1917.

Application filed January 25, 1912. Serial No. 673,403.

*To all whom it may concern:*

Be it known that I, WALTER STANDISH SMITH, a citizen of the United States, residing at Columbus, in the county of Franklin and State of Ohio, have invented certain new and useful Improvements in Automatic Scales, of which the following is a specification.

My invention relates to automatic scales and has particular relation to that type of scales known as the steelyard scale, although it is not necessarily confined to such type. The essential feature of my invention is the provision of such a structure and operation, that the movement of the scale out of perfect balance, causes the counter-balance weight to automatically move to a position to return the scale to perfect balance. This is true when material to be weighed is placed upon the unloaded scale, causing a tilting of the scale beam, since the tilting of such scale beam results, almost instantaneously, in causing the counter-balance weight to travel thereon to a position or point of perfect balance. If this material being weighed is then removed and a greater quantity and mass of material is substituted therefor, the counter-balance weight will not move until a switch utilized in my invention, is operated. However, immediately upon the operation of this switch, the counter-balance weight will commence to travel and will return to the new point of perfect balance.

Endeavors have been made in the past to produce a scale which is automatic in its action in the manner hitherto described by me, but the majority of these scales have been so lacking in accuracy that they are of no practical value.

I have discovered that, in the building of a scale of this type, there are two essential things to be taken care of. One of these things is the inertia of the traveling counter-balance weight and the other is the frictional stresses to which the scale is inevitably subjected in the conduction of power to the counter-balance weight to effect an automatic travel thereof.

Therefore, my invention primarily consists in the provision of structural characteristics for a scale using an automatically movable counter-balance weight, which structural characteristics are such as to automatically guard against and practically eliminate the inertia of the traveling counter-balance as it reaches a point of perfect balance. In order to render this most effective, I therefore desirably provide means for grading or gradually decreasing the speed of travel of the counter-balance weight during its proximate approach to the point of perfect balance whether in forward movement or in reverse movement. The preferred embodiment of my invention contemplates the provision of a counter-balance weight movable upon the long arm of the scale beam of a steelyard scale and caused to move along such arm under the control of an electric motor which is desirably mounted upon the counter-balance weight and in effect forms a part thereof. The structure is such that any unbalancing weight applied upon either side of the fulcrum of the scale beam, serves to close a circuit to initially start the motor and cause the counter-balance weight to travel toward its point of perfect balance, that is, if the controlling switch of the scale is in proper position to permit such closure of the circuit. In this connection, it may be well to state that my invention desirably contemplates the use of, in conjunction with a steelyard scale, a plurality of local circuits and a plurality of successively closed working circuits. The local circuits desirably operate relays which cut in the working circuits at certain periods in relation to a resistance coil, whereby the working circuits are of variable resistance for a purpose to be more fully described hereinafter. In conjunction with the working of these circuits, I preferably utilize a three pole double-throw switch. After the initial-starting of the motor and the traveling thereof a certain distance, the circuits of varying resistance are thrown into operation successively in overlapping relation and cause the counter-balance weight to move toward the point of perfect balance. The varying resistance of the successively thrown-in circuits, causes a gradual tapering or grading of the speed of travel of the counter-balance weight until, at the point of perfect balance, the counter-balance weight has practically no impetus and the inertia of the said weight is not sufficient to carry it past the point of perfect balance. This tapering or grading of the speed of the counter-balance weight, is a feature of prime importance and is, in fact, one of the main reasons for the successful operation of my scale. In order that my speed tapering effect may be produced in the movement of the counter-balance weight to a point of perfect balance, it is essential that there be a retarding mechanism for the scale beam which will retard or decrease the rapidity of actual motion of the scale beam under the outward movement of the counter-balance weight upon its long arm, to a perfect balance position so as to permit of the gradual tapering or gradation of the speed of travel of the counter-balance weight and the synchronous gradual dropping of the counter-balance weight during its outward movement. In other words, it is absolutely essential that the scale beam be prevented from having a quick movement from an inoperative point to the point of perfect balance. I have effected this by mounting a pendulum rigidly upon the scale beam of definite mass, so that a certain definite quantity of material must be placed upon the scale before the scale beam starts to tilt. After the initial tilting action and during the return of the scale beam to the point of perfect balance, such return is retarded to a definite degree and it is in this period of retardation that the speed of the traveling weight is gradually decreased as it approaches the point of perfect balance.

My invention comprises various other features of considerable importance and of comparative necessity and these features will be brought out more clearly in the further description of my invention with reference to the drawings.

In the accompanying drawings, similar characters of reference designate corresponding parts, and, Figure 1 is a side elevation of the upper portion of a steelyard scale with my invention applied thereto and showing the various circuits diagrammatically, Fig. 2 is a plan view showing the location of the stationary contacts utilized by me for automatically closing certain of the local circuits and thereby effecting an operation of the working circuits, it being noted that the closing action is so timed as to effect an overlapping of the working circuits so that the motor of the machine is under control at all times after starting, Fig. 3 is a sectional view taken on line 3—3 of Fig. 1 and showing the scale structure, Fig. 4 is a sectional view taken on line 4—4 of Fig. 1, Fig. 5 is a section taken on line 5—5 of Fig. 3, and Fig. 6 is a detail view of one of the stationary contact series supporting elements of my scale.

Referring to the drawings by reference numerals, a portion of the scale structure is shown at 1 as carrying a standard 2, carrying a scale beam 3 upon a knife edge pivot 4, which scale beam has connected to its short arm a pole rod structure 5. This short arm is also steadied in its operation in the well known manner, by a dash pot 6 and the balance of the scale is regulable by a shifting weight 7. Rigidly carried upon the scale beam and depending therefrom is a pendulum weight 8 and this pendulum weight is definitely proportioned so that the movement of the scale beam away from or toward a point of perfect balance, is only effected against the gravity tendency of the said pendulum 8. In consequence of this, there is effected a retardation of the movement of the scale beam toward and from a point of perfect balance. The effect is to partially counter-balance any inertia of a traveling weight upon the scale beam in a manner to be hereinafter described.

The long arm of the scale beam 3 is provided with a rack edge, that is, the lower edge thereof and upon its outermost extremity carries a contact element in the form of resilient strips 9 and end pieces 10 and 11, the outermost piece carrying a pointer 12 operative in conjunction with a graduated strip 13 mounted upon the framework of the scale. The scale beam 3 further carries spaced pieces of insulation 14 and 15 carrying trolley wires 16 and 17 and 18 and 19 individually connected by contacts $16^a$, $17^a$, $18^a$ and $19^a$ to torsional conducting strips $16^b$, $17^b$, $18^b$ and $19^b$, in turn extending to posts mounted upon the standard 2 but insulated therefrom and designated respectively $16^c$, $17^c$, $18^c$ and $19^c$. The essential and important feature of this particular connection, resides in the fact that the connecting strips $16^b$, $17^b$, $18^b$ and $19^b$ are torsional strips and any movement of the scale beam away from perfect balance, simply exerts a stress which is equalized in the return to perfect balance, these strips being slightly longer than the distance between their points of connection to allow of the swinging movement, as is shown in Fig. 5. Thus any friction or drag of wires upon the scale beam is entirely obviated. The importance of this will be apparent.

The standard 2 may be formed with triangularly disposed legs 20 and 21 and at its upper end is bifurcated to provide legs 22 and 23 carrying vertical arms 24 and 25. Each of the arms 24 and 25 is provided (referring to Fig. 6) with blocks of insulation 26 and 27 having contact elements embedded therein in respective series 28 and 29 and 30, 31, 32 and 33 and the particular arrangement of these contact blocks is shown in Fig. 2, although the spacing thereof is not entirely accurate. One of the important features of this particular structure is the manner of mounting the blocks of insulation upon the T-heads of the vertical arms 24 and 25. It will be seen that they are secured thereon by bolts 34 and 35, but are spaced therefrom by blocks of resilient material 36 and 37. By this utilization of these blocks of resilient material, it is possible to slightly vary the plane of the working surfaces of the blocks of insulation. It will be noted that the contact blocks or points 28 and 29 are disposed upon parallel lines extending respectively between contact points or blocks 30 and 31 and consequently fill a gap caused by the spacing of these blocks. The purpose of this will be more fully explained hereinafter.

Vertically extending from the scale beam at the fulcrum thereof, is an arm 38 and this arm 38 carries a bridge contact member 39 of flexible form and having legs 40 and 41 normally bent into operative relation to the blocks of insulation 26 and 27 respectively and coacting with the contacts carried thereby.

Slidably mounted upon the scale beam is a motor counter-balance weight 42 comprising a series motor 43 having a pinion 44, gear 45, pinion 46 and gear 47 coacting therewith to drive a pinion 48 meshing with a rack 49 upon the lower edge of the scale beam. The weight is provided with slideways to permit it to travel upon the scale beam and along the trolley wires 16, 17, 18 and 19. This counter-balance weight is further provided with chambers wherein are carried contact elements which individually connect these trolley wires to the field and the remainder of the motor. Two of these contact elements are shown at 50 and 51 and they are of a resilient nature. This resilient form of contact members serves a special purpose in the final stopping of the travel of the motor weight since the resilience is sufficient to effect a slight brakage of the motor and assist in stopping the same abruptly.

Mounted upon the framework of the scale is a standard 52 embodying a yoke at its upper end carrying vertically spaced contacts 53 and 54.

It is thought that a description of the wiring independently of the tracing of the circuits and the accompanying description of the operation of the scale, will not be necessary and therefore the wiring will be designated by suitable numerals as the description of the operation proceeds, it being understood that the local circuits derive their current from batteries and control relays successively to cut in circuits of varying resistance extending in series through the series motor.

In Fig. 1, the scale is shown as being at a perfect balance and it may be understood that the three-pole double throw switch is in the normal position of operation bridging the central and the left-hand contacts of the showing in Fig. 1. If sufficient additional weight is applied thereto, the long arm of the scale beam will be tilted upward until contact is made between the resilient element 9 and the contact member 54. A circuit is thereby closed from the battery 55 through line 56, line 57, electro-magnet of the relay 58, wires 59, 60, 61 and 62, contact 54, resilient element 9, scale beam 3 which is insulated from its standard by bearings of agate 4, wires 63, 64 and 65, contacts 66 and 67, wire 68, back to the battery 55. The immediate effect of this is the attraction of the armature of the relay 58 whereby the circuit is closed from the positive main through wire 69, through the armature of said relay, line 70, wires 71, 72, 73 and 74, torsion strip 16$^b$, trolley wire 16 through the armature in the direction of the heavy arrow to trolley wire 17, torsion strip 17$^b$, post 17$^c$, wires 75, 76, 77 and 78, contacts 79 and 80, wires 81, 82, 83, 84 and 85, contact post 18$^c$, torsion strip 18$^b$, contact post 18$^a$, trolley wire 18 through the field in the direction of the heavy arrow to trolley wire 19, contact 19$^a$, torsion strip 19$^b$, contact post 19$^c$, wires 86, 87, 88, 89 and 90, binding post 91, along the arm of the switch to binding post 91$^a$ to the negative main. As so far described, the local circuit has closed the first working circuit through the motor from the mains and the motor has started to move toward the new point of perfect balance.

Movement of the motor serves to gradually depress the long arm of the scale beam and as a result of such depression, the leg 41 of the bridge contact 39 moves into coactive relation to the contact block 30. As a result the circuit is closed. The depression of the scale beam immediately breaks the contact at 54, but the breaking of the circuit at this point, occurs a slight time after the closing of the circuit at 30. As a result, the high speed is initially interfered with by the intermediate speed and being finally thrown out of control of the motor is succeeded by the intermediate speed through the following circuits. This interference is of extreme importance in order that the motor may be unfailingly maintained under control, but it is not believed to be necessary to endeavor to trace these conflicting circuits. The main effect produced is the operative condition of the two relays at one time. When the intermediate speed circuit has full sway, the local circuit may be traced from battery 55, wires 56 and 57 around the core of the electromagnet 92, through wires 93, 94, and 95 to contact 30, bridge leg 41, through vertical arm 38 to wires 63, 64, and 65 to contact post 66 along the arm of the switch to contact post 67 and through wire 68 to the battery 55. The working circuit will then be from the positive main through line 69 and section of the resistance coil 96 through the armature of the relay 92, wires 70, 71, 72, 73 and 74, contact post 16ᶜ, torsion strip 16ᵇ, contact 16ᵃ, trolley wire 16 through the armature of the motor in the direction of the solid black arrows to trolley wire 17, through trolley wire 17, contact 17ᵃ, torsion strip 17ᵇ, contact post 17ᶜ, wires 75, 76, 77 and 78, binding post 79 along the arm of the switch to contact 80, wires 81, 82, 83, 84 and 85, contact post 18ᶜ, torsion strip 18ᵇ, contact 18ᵃ, trolley wire 18 through the field of the motor in the direction of the solid black arrows, through the trolley wire 19, contact 19ᵃ, torsion strip 19ᵇ, contact post 19ᶜ, wires 86, 87, 88, 89 and 90, contact 91 and through contact 92 to the negative main. Continued movement of the bridge member 39 carries its leg 41 off the contact 30, but simultaneously moves its leg 40 into coacting relation with contact 28. Inasmuch as contacts 28 and 30 are connected to the same wire by branches shown in Fig. 2, the intermediate speed is still maintained in control of the motor while such connections are made. It will be understood of course that the motor weight is traveling along the scale beam during this period and so far has had its speed of travel cut down from the initial high speed to an intermediate speed.

Still further movement of the motor weight carries the bridge contact 39 out of coactive relation with the contact 28, but slightly previous thereto moves the leg 41 of the bridge contact 39 into coactive relation with the contact 31. Thus during the termination of the intermediate speed control, a low speed circuit enters into conflict with the intermediate speed circuit and such low speed circuit is closed by the local circuit traced as follows: from the battery 55, through wires 56, 57, around the core of the relay 97, through wires 98, 99 and 100, contact 31, leg 40 of the bridge 39, vertical arm 38, wires 63, 64 and 65, contact 66 along the arm of the switch to the contact 67 and wire 68 to the battery. This energizes the electro-magnet of the relay which attracts the armature thereof establishing a working circuit from the positive main through wires 69, resistance coil 96, armature of the relay 97 through wires 70, 71, 72, 73 and 74, binding post 16ᶜ, torsion strip 16ᵇ, contact 16ᵃ, trolley wire 16 through the armature of the motor in the direction of the solid black arrows 2 and through trolley wire 17 to contact 17ᵃ through torsion strip 17ᵇ, binding post 17ᶜ, wires 75, 76, 77 and 78 to contact 79, then along the arm of the switch to contact 80, through wires 81, 82, 83, 84 and 85 to binding post 18ᶜ through torsion strip 18ᵇ, contact 18ᵃ through trolley wire 18 and thence through the field of the motor in the direction of the solid black arrows to and through trolley wire 19 to contact 19ᵃ, through torsion strip 19ᵇ, binding post 19ᶜ, wires 86, 87, 88, 89 and 90 to binding post 91 along the arm of the switch to binding post 92 and thence to the negative main. During the early portion of the period of closure of this low circuit, it is in conflict with the intermediate circuit, but this is only for a short period, for the intermediate circuit is subsequently automatically cut out and the low speed circuit attains full sway and control of the motor which is at this time closely approaching a point of perfect balance on the scale beam and is traveling at a very low rate of speed.

Continued movement at such low rate of speed, finally causes the motor weight to attain its point of perfect balance upon the scale beam and when such position is attained, the bridge contact element 39 has passed off the contact 31 and is in fact in the position shown in Fig. 6. At this point, further tilting of the beam is practically precluded by the weighted pendulum 8 and further movement of the motor weight is absolutely precluded by the frictional effect of the contact members 50 and 51.

Hitherto, the description and tracing of the circuits has been confined to circuits closed during the positive and forward movement of the counter-balance weight and effecting such positive and forward movement. From now on in the specification, it may be understood that the reverse movement of the counter-balance weight is to be effected. This reverse movement is necessary when the counter-balance weight is at a point upon the scale beam away from its normal point of perfect balance when the scale is unloaded. Furthermore, the material to be weighed having been placed upon the scale, is found to be less than sufficient to raise the long arm of the scale beam with the counter-balance weight so located. In consequence, the counter-balance weight must take a reverse movement under electrical control to reach its new point of perfect balance. In order to effect this, the three pole double throw switch must be swung upon its pivots to bridge contacts 66, 79 and 91ᵃ and the three contacts to the right thereof in Fig. 1 of the drawings. If it is understood that the switch is in this adjusted position and sufficient material is removed from the scale to permit the counter-balance weight to depress the long arm of the scale beam, a contact will be made between resilient strips 9 on the end of the beam and contact 53. This will serve to close a circuit from battery 101, wires 102, 103 and around the core of relay 104 through wires 105, 106 and 107, through contacts 53 and 9, along the scale beam 3, through wires 63, 64 and 108, contact 66, along the arm of the switch to contact 108ᵃ, wire 109 and to the battery 101. This serves to close the working circuit from the positive main through wire 69ª, through the armature of the relay 104 through line 110, wires 71, 72, 73 and 74, binding post 16ᶜ, torsion strip 16ᵇ, contact 16ª and trolley wire 16 through the armature of the motor in the direction of the dash-line arrows to and through trolley wires 17, contact 17ª, torsion strip 17ᵇ, binding post 17ᶜ, wires 75, 76, 77 and 78 to contact 79 along the arm of the switch to contact 111, through cross bridge wire 112 through wires 90, 89, 88, 87 and 86 to binding post 19ᶜ, torsion strip 19ᵇ, contact 19ª, trolley wire 19 through the field of the motor in the direction of the dash-line arrows to trolley wire 18 and therethrough to contact 18ª, torsion strip 18ᵇ binding post 18ᶜ, wires 85, 84, 83, 82 and 81, contact 80, across bridge wire 113 to contact 114 along the arm of the switch to contact 91ª and thence to the negative main. During the closure of these local and work circuits just described, the motor is moving rearwardly upon high speed. The immediate effect is the tendency to upward movement of the long arm of the scale beam as it is being relieved of the depressing weight of the counter-balance weight. This tendency to upward movement is necessarily retarded as hitherto pointed out, by the provision of the weighted pendulum structure. As the high speed is about to be cut out, the bridge element 39 through the medium of its contact leg 41 moves into coöperative relation to the contact 33 and at this time the high speed circuit is in conflict with the intermediate speed circuit. Further movement cuts out the high speed circuit and the intermediate speed circuit gains full sway by closure thereof at contact 33. This of course has reference to the local circuit which in turn closes the work circuit. The local circuit closed at this point, is from battery 101, through wires 102 and 103 around the core of the relay 115, through wires 116, 117 and 118 to contact 33, arm 41 of bridge contact element 39 through the vertical arm 38 to wires 63, 64 and 108 to contact 66, along the arm of the switch to contact 108ª, wire 109 and to battery 101. By this action the working circuit is closed from the positive main through a portion of the resistance coil 119 to the armature of relay 115, line 110, wires 71, 72, 73 and 74, binding post 16ᶜ, torsion strip 16ᵇ, contact 16ª trolley wire 16 through the armature of the motor in the direction of the dash-line arrows to and through the trolley wire 17, contact 17ª, torsion strip 17ᵇ. binding post 17ᶜ, wires 75, 76, 77 and 78 to the contact 79 along the arm of the switch to the contact 111, through cross bridge wire 112 to contact 91, wires 90, 89, 88, 87 and 86 to binding post 19ᶜ, torsion strip 19ᵇ, contact 19ª to trolley wire 19 through the field therefrom in the direction of the dash-like arrows to trolley wire 18, contact 18ª, torsion strip 18ᵇ, binding post 18ᶜ, wires 85, 84, 83, 82 and 81 to binding post 80, cross bridge wire 113 to contact 114 and along the arm of the switch to binding post 91ª and thence to the negative main. This circuit is closed while the bridge element 39 has its arms contacting with contacts 33 and 29 and in consequence thereof, the motor is at this time subjected to an intermediate speed circuit with the exception of the initial operation of closure of such intermediate speed circuit when the high speed circuit is in conflict therewith and with the exception of the final operation of the intermediate speed circuit when the low speed circuit is in conflict therewith in a manner about to be described.

As the counter-balance weight more nearly approaches a point of perfect balance on the scale beam, the bridge contact element moves into circuit closing relation with contact 32, whereupon a local circuit is closed from battery 101, through wires 102, 103, around the core of the relay 120, through wires 121, 122 and 123, contact 32, bridge contact element 39 through the arm 38, wires 63, 64 and 108 to contact 66 along the arm of the switch to contact 108ª, wire 109 and back to battery 101. This closes a working circuit at the relay 120 and such working circuit extends from the positive main through the entire resistance coil 119 through the armature of the relay 120, line 110, wires 71, 72, 73 and 74 to binding post 16ᶜ, torsion strip 16ᵇ, contact 16ª, trolley wire 16, through the armature of the motor in the direction of the dash-line arrows to and through the trolley wire 17, contact 17ª, torsion strip 17ᵇ, binding post 17ᶜ, wires 75, 76, 77 and 78 to contact 79 along the arm of the switch to contact 111, through cross bridge wire 112 to contact 91, along wires 90, 89, 88, 87 and 86 to binding post 19ᶜ, torsion strip 19ᵇ, contact 19ª, trolley wire 19 through the field of the motor in the direction of the dash-line arrow to and through the trolley wire 18 to the contact 18ª, through torsion strip 18ᵇ, binding post 18ᶜ, wires 85, 84, 83, 82 and 81 to contact 80 and through cross bridge wire 113 to contact 114 and along the arm of the switch to contact 91ª and thence to the negative main. At this time the traveling counter-balance weight is under the control of the slow speed circuit and is about to reach its point of perfect balance. When it reaches such point of perfect balance, the low speed circuit has just been cut out and the coactive effect of the weighted pendulum 8 with the braking contact members 50 and 51, serves to stop the counter-balance weight and nullify the effect of inertia.

From the description given above of my invention and of the operation thereof, it will be apparent that there are two essential and all-important things in my improved scale. The first of these is that the scale beam be subjected to a retarding action in its movement toward a point of perfect balance, so that such movement toward a point of perfect balance, may be segregated into determinate and known parts. This retarded movement is utilized in conjunction with a traveling weight element, desirably traveling under the control of a motor, which traveling weight element is subjected by the control of such motor to a series of overlapping and determinate degrees of speed dependent upon the cutting in of definite circuits which are automatically cut in. More specifically, it may be stated that the movement toward a point of perfect balance, is a retarded movement and the travel of the weight in its approach to such point of perfect balance, is at all times under the control of the motor and the speed of travel of this weight is definitely graded and cut down in its approach to the point of perfect balance, so that when it actually strikes such point of perfect balance, it is barely moving and such bare movement creates such a small impetus in the counter-balance weight that the inertia resulting therefrom can be readily taken care of and is in fact readily taken care of by the coactive effect of the weighted pendulum structure and the braking structure of the contact elements upon the trolley wires.

By way of reiteration and for the purpose of defining the operation of my invention as clearly as possible, it is considered well to re-state the matter contained in the preceding paragraph, as follows: The weighted pendulum utilized by application to the scale beam and with its center of gravity below the fulcrum thereof, is a distinct element to be calculated and considered at all times, in order to understand the exact operation of my machine. For instance, if material of fifty pounds in weight is placed upon the scale, presuming the scale beam to be in normal position of rest and perfect balance, the short arm of the scale beam is pulled downwardly with a force of fifty pounds. At the same time, the weighted pendulum is swung away from its normal gravity position until it has the effect of a certain definite weight applied to the long arm of the scale beam. For purpose of illustration, I will assume that this pull upon the long arm of the beam by the pendulum, amounts to one pound. If the switch is closed for a positive weighing operation, the counter-balance weight will automatically move forward along the long arm of the scale beam and such movement will continue without effect upon the scale beam until the pull upon the long arm by the counter-balance weight alone, amounts to forty-nine pounds. At this point, the long arm of the scale beam starts to fall.

Under ordinary conditions and without a weighted pendulum, this fall would be sudden as in all scales and would not take place until the counter-balance weight, alone, effected a pull of fifty pounds upon the long arm of the scale beam. Now, the counter-balance weight continues to move outwardly upon the long arm of the scale beam until it reaches this fifty pounds, but as the counter-balance weight moves from forty-nine to fifty on the long arm of the scale beam, the pendulum gradually recedes and loses its counter-balancing effect, being superseded in such counter-balancing effect by the counter-balance weight alone. During this period wherein the pendulum is returning to normal position and the counter-balance weight is traveling from forty-nine to fifty, there is a balancing action and this balancing action will be referred to as a retardation of the actual motion of the scale elements to a point of perfect balance.

The slow approach to the point of perfect balance, is alone sufficient to detract from the tendency of the weight to move past the point of perfect balance, but this is only a portion of the means which I utilize to effect this result.

The preferred method of effecting the result mentioned above and of entirely destroying the ill-effects of inertia, is embodied in the structure described and resides in an automatic control of the motor which drives the counter-balance weight. This motor is automatically controlled as stated and the speed thereof in movement toward the point of perfect balance, is gradually decreased or is decreased by steps until, when it strikes the point of perfect balance, it is barely moving. Under ordinary conditions, I prefer to control the motor in such a manner that it moves at high speed until the actual motion of the scale elements toward perfect balance commences. At this point and simultaneously with the beginning of such motion, an intermediate speed control of the motor is thrown into effect and is very shortly superseded by a low speed, which low speed carries the motor to the point of perfect balance. Thus a great portion of travel of the counter-balance weight is made at high speed, whereas it makes its proximate approach to the point of perfect balance under two distinct speeds, that is, an intermediate and then a low speed. It may be well to state, however, at this point that the conflict of the overlapping circuits utilized in the control of the motor in reality produces five distinct speeds, but for all practical purposes, it will be sufficient to refer to the grading action as comprising three speeds. The cutting in of the intermediate and then the low speed, in the short period of travel of the counter-balance weight, is of course made possible by the retarding action of the pendulum weight upon the actual motion of the scale elements to perfect balance.

It is realized that after the scale beam has been set in motion by the action of the pendulum, this beam is in a state of balance for, should the counter-balance weight be stopped at any position after the scale beam has assumed its motion, this beam will come to rest in a slightly inclined position. However, throughout the specification and claims where I have referred to a perfect balance position, I mean a state of equilibrium for the scale elements in which they are in a position to indicate the weight applied, or in other words, they have assumed a weight indicating position.

In addition to this, all deleterious frictional effects are practically obviated by the utilization of torsional strips as opposed to hanging wires of any type. The torsional strips when moved out of their normal position, develop a stress which is given up in their return to normal position and in consequence of this, they have no effect upon the weighing action. The use of the torsional strips amounts to a substitute for other forms of contacts such as mercury contacts. Mercury contacts are undesirable under ordinary circumstances because of their susceptibility to changes under varying weather conditions and because of the danger of spilling the mercury.

What I claim, is—

1. A scale comprising a beam, a counter-balance weight, an electric motor controlling the movement of said weight to a point of perfect balance, a plurality of circuits of varying resistance, circuit closers, means for causing tilting of said beam independent of said weight upon the approach of said weight to a perfect balance position, and means operable by the tilting of said beam to successively close said circuits through said motor by the operation of said circuit closers and thereby operate the motor at varying speeds to return said weight to a point of perfect balance.

2. A steelyard scale comprising a beam, a weight, an electric motor for controlling the movement of said weight to a point of perfect balance, a plurality of rheostatic circuits, and a circuit closing structure automatically operative by tilting of said beam to successively close said circuits through said motor in overlapping relation to vary the speed of travel of said weight in its approach to such point of perfect balance.

3. A steelyard scale comprising a beam, a weight, an electric motor for controlling the movement of said weight to a point of perfect balance, a plurality of rheostatic circuits, a circuit closing device operative by tilting of the scale beam to close one of said circuits through said motor for initiating movement of said weight, a plurality of contact elements arranged in overlapping relation, and a bridging device therefor rendered operative by tilting of the beam for successively closing said circuits through said motor to maintain the movement of said weight at varying speeds until the point of perfect balance is reached.

4. A steelyard scale comprising a beam, a weight, an electric motor for controlling the movement of said weight to a point of perfect balance, a starting circuit through said motor, means for closing said circuit by the tilting of the beam under applied weight on the scale, a plurality of circuits of stepped degrees of resistance, and a circuit closing device for successively closing said circuits through said motor by further tilting of the beam to propel said weight at varying speeds until the perfect balance point is reached.

5. A steelyard scale comprising a beam, a weight, an electric motor for controlling the movement of said weight to a point of perfect balance, a starting circuit through said motor closed by the tilting of the beam under applied weight on the scale, a plurality of circuits of stepped degrees of resistance, and a circuit closing device for successively closing said circuits through said motor by further tilting of the beam to propel said weight at varying speeds until the perfect balance point is reached, said circuits being all closed in overlapping relation.

6. A steelyard scale comprising a beam, a weight, an electric motor for controlling the movement of said weight to a point of perfect balance, a starting circuit through said motor, means for closing said circuit by movement of the scale beam to either limit of its path of travel, a plurality of circuits of stepped degrees of resistance in circuit with said motor, a contact for each circuit, and a complemental contact movable with the tilting of the scale beam into successive closure with said first contacts.

7. A steelyard scale comprising a beam, a weight, an electric motor for controlling the movement of said weight to a point of perfect balance, a starting circuit through said motor, means for closing said circuit by movement of the scale beam to either limit of its path of travel, a plurality of circuits of stepped degrees of resistance in circuit with said motor, a contact for each circuit, and a complemental contact movable with the tilting of the scale beam into successive closure with said first contacts, said contacts being disposed so as to cause overlapping of said contact.

8. A steelyard scale comprising a beam, a series of teeth carried by said beam, an electric motor counter-balance weight on said beam and geared to said teeth, a pendulum rigidly carried by said beam beneath the fulcrum point, means for supplying said motor with current, and means for gradually decreasing such current upon the approach of said counter-balance to the perfect balance point.

9. A steelyard scale comprising a beam, a series of teeth on said beam, an electric motor counter-balance weight on said beam and geared to said teeth, a plurality of trolleys carried by said beam, a pendulum rigidly connected to said beam beneath the fulcrum point, a stationary contact, a contact carried by said beam and movable therewith, a local circuit, a plurality of relays connected to said circuit and operable by movement of said beam out of balancing position, and a motor circuit operatively connected to said trolleys.

10. A scale comprising a beam, a motor counter-balance weight movable on said beam, means for automatically moving said weight to a point of perfect balance, means for retarding the actual motion of the scale elements to a perfect balance, and means for reducing the speed of said motor counter-balance weight during such actual motion of the scale elements.

11. A scale comprising a beam, a motor counter-balance weight movable on said beam, means for automatically moving said weight to a point of perfect balance, means for retarding the actual motion of the scale elements to a perfect balance, and means for reducing the speed of said motor counter-balance weight by steps during such actual motion of the scale elements.

12. In a scale, a pivotally mounted beam, a motor counterpoise slidably mounted on said beam, a trolley wire mounted on said beam, an electrical connection between said motor and said trolley wire, a stationary support adjacent the pivot point of said beam, and a flexible electric conductor supported from said support and connected to said trolley wire.

13. In a scale, a supporting standard, a beam pivotally mounted on said standard, a motor counterpoise slidably mounted on said beam, a plurality of trolley wires mounted on said beam, electrical connections between said trolley wires and said motor, and a plurality of flexible electric conductors supported at one end on said standard and connected to said trolley wires at their other ends.

In testimony whereof I affix my signature in the presence of two witnesses.

WALTER STANDISH SMITH.

Witnesses:
 EDWIN P. CORBETT,
 WALTER E. S. BOCK.

Copies of this patent may be obtained for five cents each, by addressing the "Commissioner of Patents, Washington, D. C."